E. F. GOODMAN.
HANGER CONSTRUCTION FOR AUTO RUNNING GEAR SPRINGS.
APPLICATION FILED JULY 12, 1913.
1,088,777.
Patented Mar. 3, 1914.
2 SHEETS—SHEET 1.
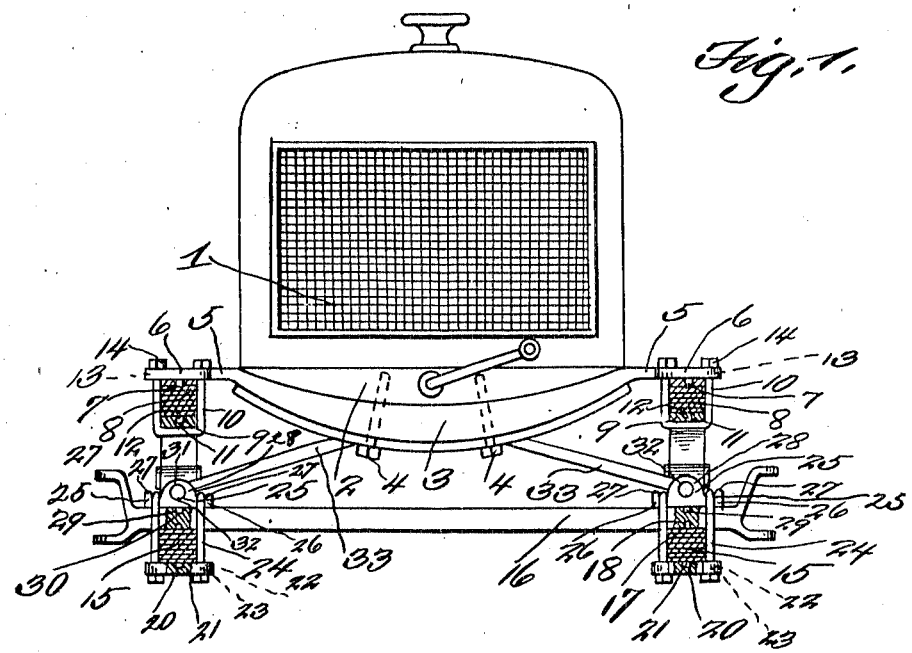
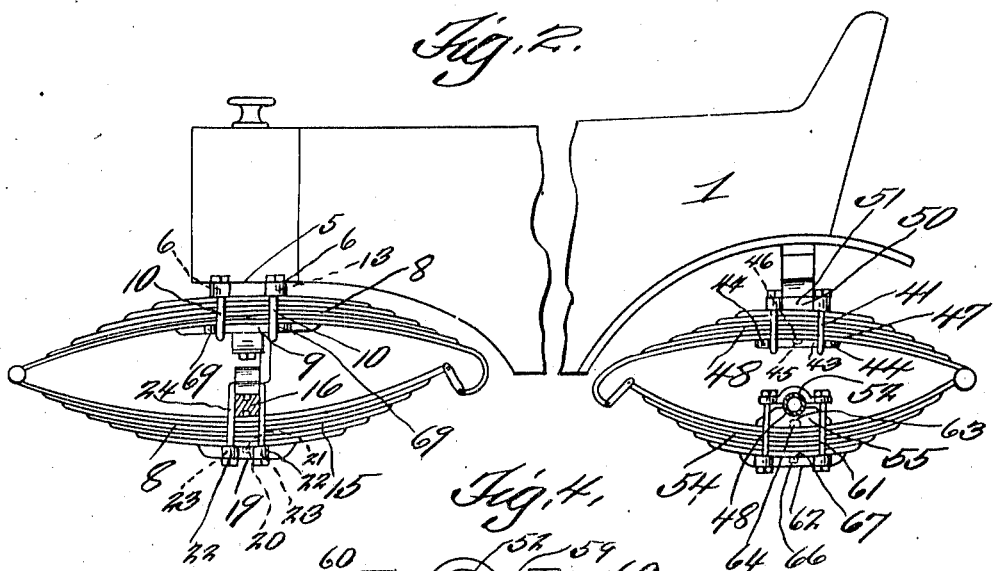
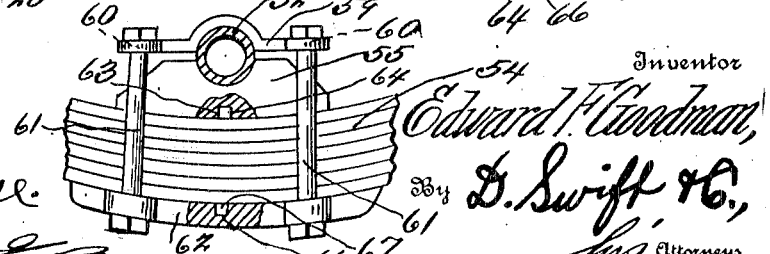
Witnesses
Inventor
Edward F. Goodman,
By D. Swift &c.,
Attorneys

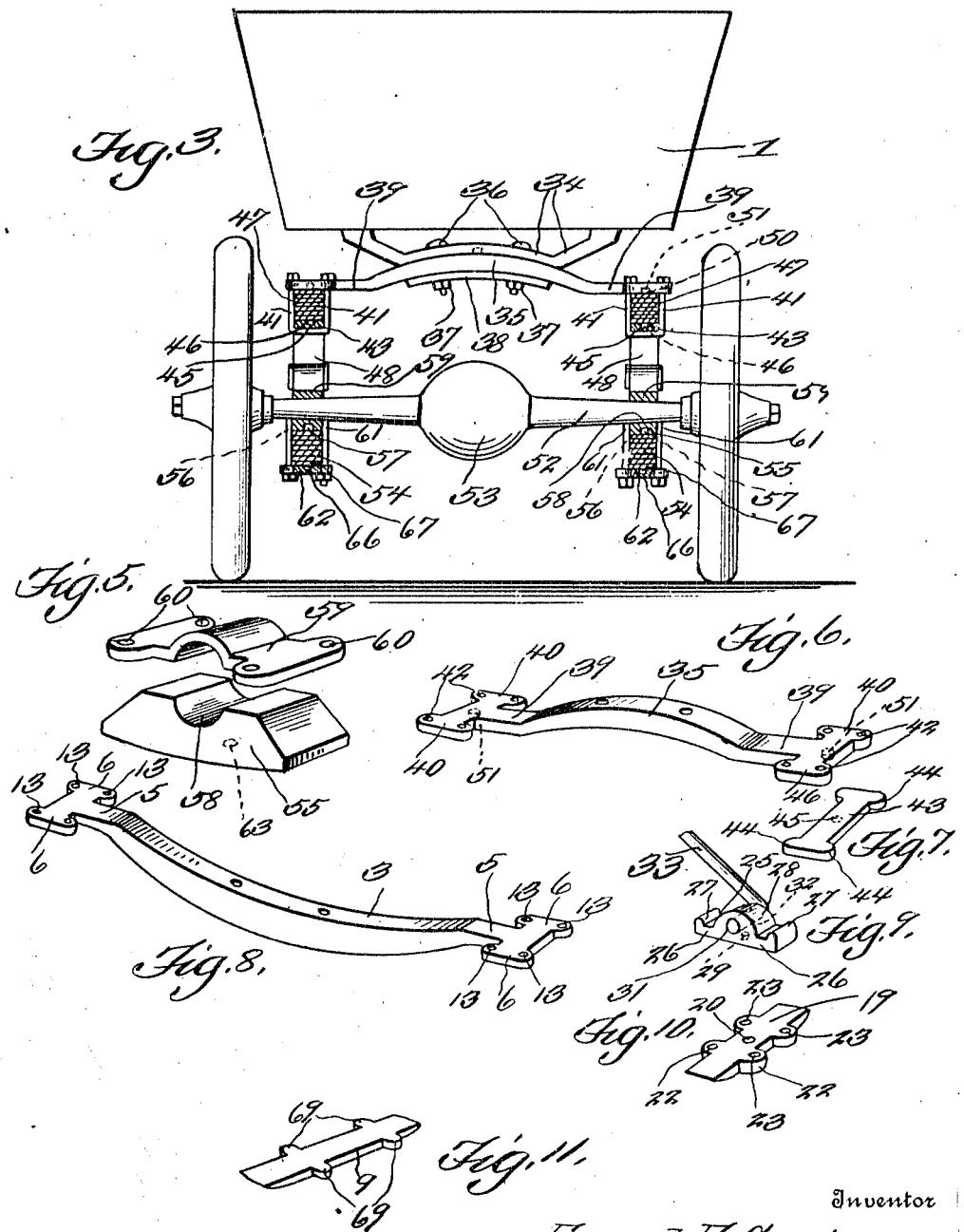

UNITED STATES PATENT OFFICE.

EDWARD F. GOODMAN, OF AUGUSTA, GEORGIA.

HANGER CONSTRUCTION FOR AUTO RUNNING-GEAR SPRINGS.

1,088,777.  Specification of Letters Patent.  Patented Mar. 3, 1914.

Application filed July 12, 1913. Serial No. 778,811.

*To all whom it may concern:*

Be it known that I, EDWARD F. GOODMAN, a citizen of the United States, residing at Augusta, in the county of Richmond and State of Georgia, have invented a new and useful Hanger Construction for Auto Running-Gear Springs; and I do hereby declare the following to be a full, clear, and exact description of the invention, such as will enable others skilled in the art to which it appertains to make and use the same.

This invention relates to a new and useful hanger construction for auto running gear springs.

An object of the invention is to provide an improved hanger construction, particularly adapted for use in connection with the "Ford automobile," thereby dispensing with the hanger construction now in use upon such machines. However, this hanger construction may be applied to other makes of machines.

In practical fields the details of construction may be subjected to alterations, to which the patentee is entitled, provided the alterations fall within the scope of what is claimed.

The invention comprises further features and combination of parts, as hereinafter set forth, shown in the drawings and claimed.

In the drawings: Figure 1 is a front end view of a portion of an automobile, showing the front hanger construction for the front running gear springs. Fig. 2 is a view in side elevation showing the fragmentary portions of an automobile body, showing the front and rear hanger construction for the front and rear running gear springs. Fig. 3 is a rear view of an automobile body showing the rear hanger construction for the rear running gear springs. Fig. 4 is an enlarged detail view of the lower rear hanger showing the same applied to the rear axle. Fig. 5 is a detail perspective view of the lower rear hanger plates, that are clearly shown in Figs. 2 and 4. Fig. 6 is an enlarged detail view of the upper rear transverse hanger bar for the rear running gear springs. Fig. 7 is a detail view of a plate which is engaged by the staple bolts for holding the rear running gear springs to the rear transverse hanger bar. Fig. 8 is a detail perspective view of the front transverse hanger bar, to which the front running gear springs are connected. Fig. 9 is a detail perspective view of a plate block which rests upon the front axle to be engaged by staple bolts for suspending the lower portion of the front running gear springs. Fig. 10 is a detail perspective view of a plate which receives the staple bolts of the front axle and coöperates with the plate block for suspending the lower portion of the front running gear springs. Fig. 11 is a detail view of one of the plates 9.

Referring more particularly to the drawings 1 designates the body of the automobile, which may be of any suitable construction, preferably, however, similar to that of the "Ford" automobile. Secured to the front bolster 2 of the body is the front transverse hanger bolster bar 3, by means of the bolts 4. This front bolster bar 3 is of a contour to fit the bolster 2, and is constructed with extensions 5 having lateral portions 6. The under faces of the extensions 5 are provided with lugs 7 to engage the depressions of the upper parts of the front running gear springs 8, so as to prevent lateral movement of the springs. Upon the under surface of the upper portions of the springs 8 are plates 9, under which the staple bolts 10 arch, to hold the plates 9 in position. These plates 9 are provided with depressions 11 to receive the lugs 12 of the under faces of the upper portions of the springs 8, to prevent slipping of the plates 9. The staple bolts 10 pass through the apertures 13 of the lateral portion 6 of the extensions 5 of the front hanger bolster bar 3, and are provided with nuts 14, thereby connecting the upper portions of the springs 8 securely to the extensions 5.

The lower portions 15 of the springs 8 pass under the front axle 16, and are provided with lugs 17 to enter the depressions 18 of the axle 16 to prevent lateral movement of the lower portions 15 of the springs 8. Arranged adjacent the under faces of the lower portions 15 of the springs 8 are plates 19 provided with depressions 20 to receive the lugs 21 which further assist in preventing displacement of the lower portion 15 of the springs 8. The plates 19 are constructed with ears 22 having apertures 23, which receive the shanks of the staple bolts 24. Arranged upon the upper face of the front axle 16 are plate blocks 25 which are constructed with extensions 26 having upwardly extending ribs 27. The staple bolts 24 arch over the extensions 26 and between the ribs 27 and the enlargements 28 of the plate blocks to prevent displacement of the blocks. However, the under portions of the plate blocks are provided with lugs 29 to engage depressions 30 of the front axle, to further assist in preventing displacement of the plate blocks, particularly with relation to the front axle. The enlargements 28 of the plate blocks are provided with apertures or openings 31 to receive the angled end 32 of the rods 33, which are so arranged relative to the body 1, as to yieldably reinforce the body relative to the front axle and the front springs 8.

The rear of the body 1 is provided with the rear bolster 34, to which the rear transverse hanger bolster bar 35 is connected by the bolts 36, nuts 37 and the plate 38, as shown in Fig. 3. The rear hanger bolster bar is constructed with extensions 39 similar to the extensions 5 provided with lateral portions 40 similar to the lateral portions 6. The staple bolts 41 have their shanks passing through the apertures 42 of the lateral portions 40 of the extensions 39. These staple bolts 41 arch under the plates 43 and between the lugs or ears 44, to prevent lateral movement of the plates 43. These plates 43 are constructed with depressions 45 to receive the lugs 46 of the under faces of the upper part 47 of the rear running gear springs 48, to prevent lateral movement of said springs 48. To further assist in preventing movement of the springs 48 relative to the extensions 39, the upper faces of said springs 48 are provided with lugs 50 to enter the depressions 51 of the extensions 39.

The rear axle casing 52 is hollow and of the usual construction for containing the rear axle (not shown). This rear axle casing is provided with the usual incasement 53 for containing the driving connections (not shown) between the axle and the driving mechanism (not shown). This axle casing forms no part of the present invention, excepting that the lower portions 54 of the rear running gear springs 48 are suspended therefrom. Arranged upon the upper surfaces of the lower portions 54 of the springs 48 are the plate blocks 55 having depressions 56 to receive the lugs 57 of the lower portions of the springs 48, to prevent lateral movement of the plate blocks 55. These plate blocks 55, as shown clearly in Figs. 2, 4 and 5 are constructed with semi-circular recesses 58 to receive the rear axle casing 52, while arranged above the axle casing is a cap arched plate 59 having apertures 60 to receive the bolts 61, which also pass through the plates 62 upon the under faces of the lower parts 54 of the springs 48, thereby constituting means for holding said parts securely together. To further assist in preventing movement of the lower parts 54 of said springs 48, the plates 62 are provided with depressions 66 to receive the lugs 67.

From the foregoing it is to be observed that there has been devised an efficient and simple construction of hanger means for auto running gear springs, and one which has been found desirable and practical.

The plates 9 are provided with ears 69 to prevent movement of the staple bolts 10.

The invention having been set forth, what is claimed as new and useful is:—

1. In a hanger construction for auto running gear springs, a transverse hanger bolster bar adapted to be connected to an automobile body having end extensions, springs connected to the end extensions, a plate block resting upon the lower portions of said springs having a semi-circular recess to receive an axle casing, a cap plate arching over the upper portion of the axle casing, plates arranged adjacent the under surface of the lower portions of said springs, bolts passing through the cap plate and the lower plates and provided with means to hold the bolts in place.

2. In a hanger construction for auto running gear springs, a transverse hanger bolster bar adapted to be connected to an automobile body having end extensions constructed with lateral portions, elliptical running gear springs having their upper portions arranged adjacent the under faces of said end extensions, plates arranged against the under surfaces of the upper portions of said elliptical springs, staple bolts arching under said plates and having their shanks penetrating said lateral portions and provided with means for holding the staple bolts in place, means to prevent the plates and the upper portions of the springs against displacement relative to the extensions, and connections between the lower portions of said springs and an automobile axle.

In testimony whereof I have signed my name to this specification in the presence of two subscribing witnesses.

EDWARD F. GOODMAN.

Witnesses:
W. F. FULLER,
W. E. FOREMAN.